April 12, 1949.　　　M. J. STEVENS　　　2,467,240
INCREASING INTENSITY ANNUNCIATOR
ALARM FOR ODOMETERS
Filed May 19, 1945　　　　　　　　2 Sheets-Sheet 1

INVENTOR.
Milton J. Stevens
BY Carlos G. Stratton
ATTORNEY

April 12, 1949.    M. J. STEVENS    2,467,240
INCREASING INTENSITY ANNUNCIATOR
ALARM FOR ODOMETERS
Filed May 19, 1945    2 Sheets-Sheet 2
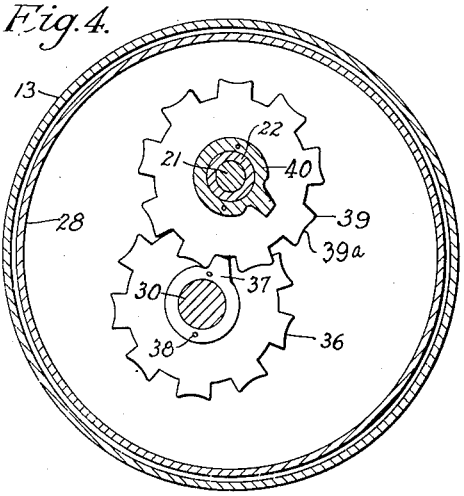
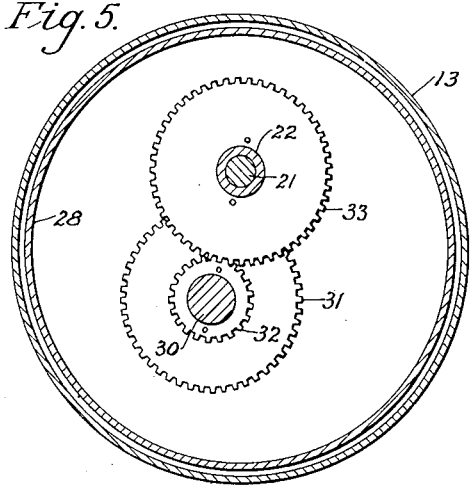
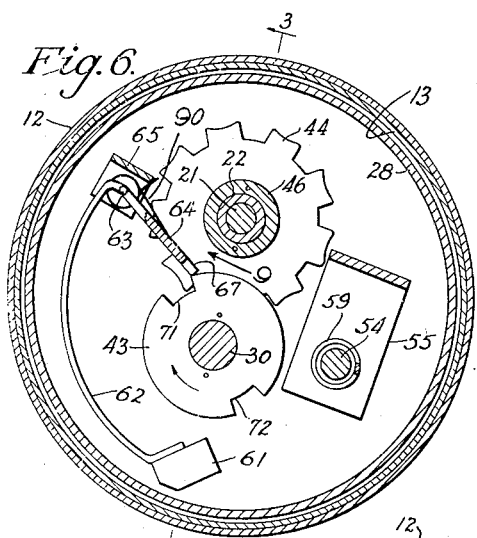
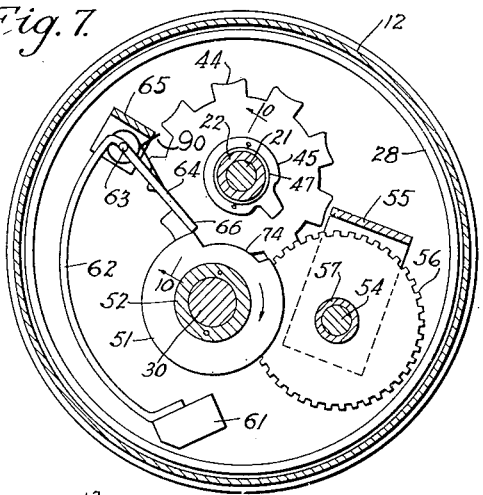
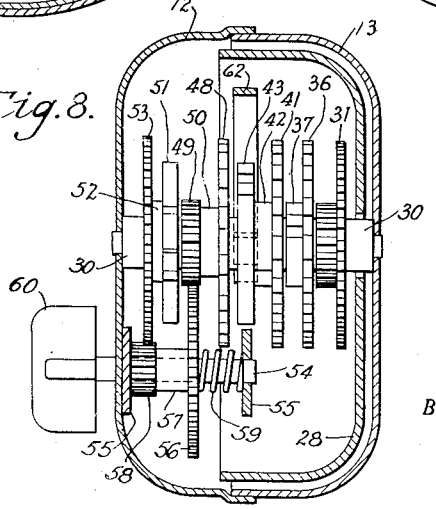
INVENTOR.
Milton J. Stevens
BY Carlos G. Stratton
ATTORNEY Patented Apr. 12, 1949

2,467,240

UNITED STATES PATENT OFFICE 2,467,240

INCREASING INTENSITY ANNUNCIATOR ALARM FOR ODOMETERS

Milton J. Stevens, Glendale, Calif., assignor of one-third to I. W. Adams, Pasadena, Calif., and one-third to Milo R. Kent, Glendale, Calif.

Application May 19, 1945, Serial No. 594,618

6 Claims. (Cl. 235—128)

My invention relates to an odometer alarm and more particularly to a device that will indicate to the driver of an automotive vehicle when the vehicle has traveled a definite distance. The present device has particular value in indicating when an automotive vehicle should be greased and/or the oil changed, after it has been driven a particular distance.

An object of the invention is to provide such a device that will actuate an alarm signal at a predetermined mileage, and which may be easily and quickly set each time a new distance is to be measured and the alarm again actuated.

Another object is to provide such a device that will sound an audible alarm in increasing intensity as the vehicle travels successively greater distances, in order to apprise the driver in a successively more emphatic manner that the engine requires attention.

A further object is to provide means that will prevent unauthorized adjustment of the device, in order to induce the driver of the vehicle to return to a certain filling station or class of stations, for lubrication of his vehicle at a prescribed time.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Figs. 4 to 7 are transverse sections taken on the lines 4—4, 5—5, 6—6 and 7—7, respectively, of Fig. 3.

Fig. 8 is an enlarged section taken on the line 8—8 of Fig. 1.

Fig. 10 is a view of the parts in the central portion of Fig. 4, but showing same in different relative positions.

Figure 1:
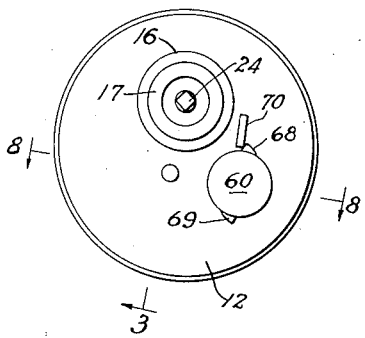
Fig. 1 is an end elevation of an embodiment of the foregoing objects.
Figure 2:
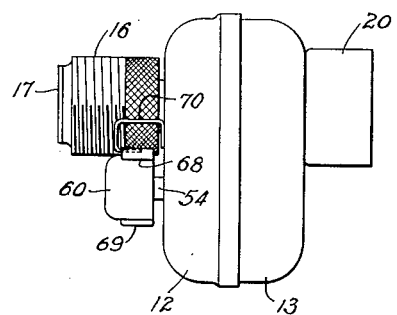
Fig. 2 is a side elevational view of said embodiment.
Figure 3:
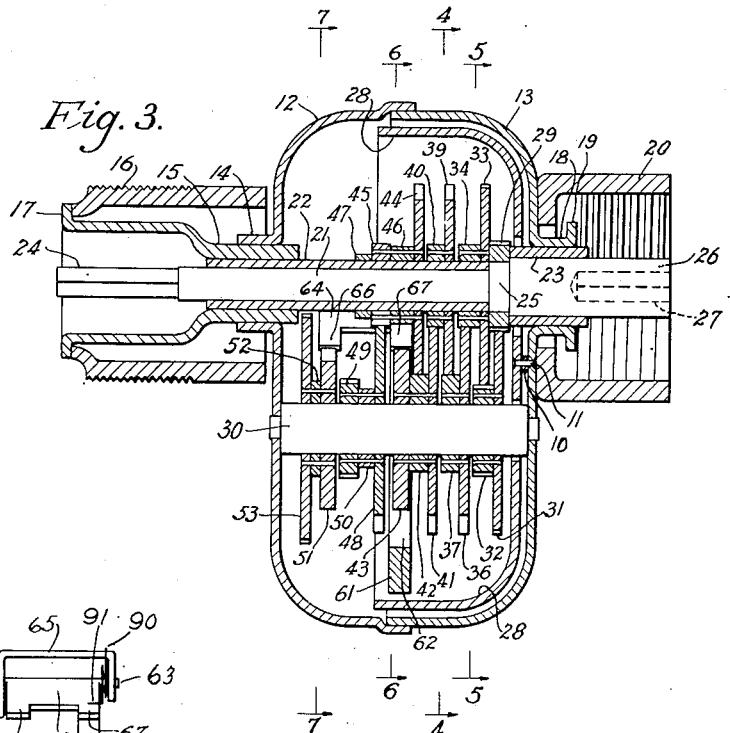
Fig. 3 is an enlarged section on the line 3—3 of Fig. 1, and a section taken on the line 3—3 of Fig. 6.

Referring more in detail to the drawings, the reference numbers 12 and 13 generally indicate telescoping portions of a housing for the present device. The housing member 12 has a flange 14 that supports a nipple 15, which in turn carries a threaded head member 16. A flange 17 at the other end of the nipple 15 prevents the escape of the head 16, but permits the free rotation of the head on the nipple.

The housing member 13 has a nipple 18 that is provided with a flange 19 at its outer end. A nut 20 is spot welded on the housing section 13.

A shaft 21 is rotatably mounted in sleeves 22 and 23. The sleeve 22 and the nipple 15 are pressed into the flange 14 so that the sleeve 22 is relatively fixed. The sleeve 23 is pressed in the flange 18. The shaft 21 has a square tip 24 similar to the end of a speedometer cable. The shaft has a stepped portion 25 that leads to a connecting end 26 that has an end-opening, square socket 27 that fits on the square end of the conventional speedometer cable. The nut 20 cooperates with a threaded end (not shown) of a sheath of the speedometer cable, to hold the cable in the socket 27.

A bell 28 is held within the housing member 13 by a rivet 11. Suitable spacing means may be employed between the bell 28 and the housing section 13, as indicated at 10. Within the bell a pinion 29 is pressed upon the stepped portion 25 of the shaft. A countershaft 30 is supported by the housing sections 12 and 13 parallel with the shaft 21 and laterally thereof. The shaft 30 acts as a spacer between the housing sections 12 and 13. A gear 31 loosely mounted on the shaft 30 meshes with the pinion 29. A companion and reducing gear 32 is pinned to the side of the gear 31 and in turn engages a gear 33 that is free to rotate upon the sleeve 22. A relatively small sized, single-toothed gear 34 is fastened to the side of the gear 33 and its tooth drives a coarse toothed gear 36 that is loose on the shaft 30. A single-toothed gear 37, similar to the gear 34, is pinned to the side of the gear 36, as suggested at 38. The gear 37 in turn engages a coarse toothed gear 39 that is free on the sleeve 22. By engaging between the teeth of the gear 39, the single tooth on the gear 37 is able to advance the gear 39 a small amount, upon each revolution of the gear 37. During rotation of the gear 37, between engaging positions, the gear 37 prevents retrograde movement of the gear 39 by engagement with the concave tips 39a of the teeth of the gear 39, as shown in Fig. 10.

Another single-toothed gear 40 is loose on the sleeve 22. The gears 39 and 40 are fastened together for conjoint rotation. The gear 40 drives a coarse toothed gear 41 on the shaft 30. A pinion 42 and a cam 43 are both riveted to the gear 41 and rotatable around the shaft 30.

Still another coarse gear 44 is arranged in the gear train. A single-toothed gear 45 is riveted to the gear 44 through a spacer 46, all loose on the sleeve 22. A ring 47 fixed on the sleeve 22 holds the gears on the sleeve 22 from sliding therealong. The last of the coarse-toothed gears 48 meshes with the gear 45. A pinion 49 is pinned to the gear 48 through a spacer 50. The gears 48 and 49 are likewise free upon the shaft 30. A cam 51 on the shaft 30 is connected through a spacer 52, with a gear 53.

An adjusting shaft 54, inserted through an opening in the housing member 12 for journaling same and also in a bracket 55, carries an adjusting gear 56. A spacer 57 separates the gear 56 from a spur gear 58, and all of them are fastened on the shaft 54. A coil spring 59 abuts against the bracket 55 and against the gear 56, urging the latter gear into a position to engage the pinion 49. The width of the pinion 58 permits it to mesh with the gear 53 in the different positions of the shaft 54. An outer end of the shaft 54, outside the housing, carries a manipulating knob 60. The knob 60 has cam-shaped bosses 68 and 69 that trip against a resilient indicating spring 70, in order to be able conveniently to count the revolutions of the knob 60. The knob is removable in order that it may act as a key, and when removed prevent unauthorized adjustment of the device. The knob may be of distinctive coloring or otherwise carry advertising of certain brands of lubricating oil, or other goods.

Figure 9:
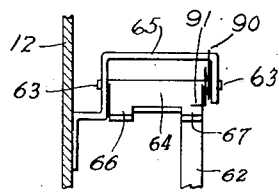
Fig. 9 is a broken elevation, partly in section, looking in the direction of the arrow 9 of Fig. 6.

A clapper 61 is arranged to strike the bell 28 interiorly thereof. A resilient strap 62 supports the clapper by means of integral pivots 63 on a forked head 64, as best shown in Fig. 9. The pivots 63 are supported on a bracket 65. One projection 66 of the forked head 64 engages the cam 51, and the other projection 67 on the head 64 engages the cam 43. A spring 90 actuates the head 64 to seat in the recesses of the cams and thereby sound the alarm, when the recesses are engaged. The spring 90 engages the bracket 65, is wound around one of the pivots 63, and is hooked across the head 64, as suggested at 91.

In the operation of my present device, it is connected with the usual speedometer cable. such cable ordinarily has a square end that fits in the recess 27. Then as a substitute for said square end of the odometer cable, the square tip 24 is inserted in a fitting socket in the odometer. The reduction train of gears is connected to sound the alarm when the vehicle has traveled the distance for which the present device is set. This does not in any way interfere with the usual operation of the odometer, since the shaft 21 provides a through connection from the socket 27 to the square tip 24.

The reduction train of gears comprises the gears 29, 31, 32, 33, 34, 36, 37, 39, 40, 41, 42, 44, 45, 48, 49, 56, 58 and 53. This, of course, is a very substantial reduction from the beginning to the end of the train. This entire train is utilized to reduce the speed of rotation of the cam 51, and all the gears named down to the gear 42 are utilized to reduce the speed of rotation of the cam 43.

The alarm cannot sound until the projection 66 reaches a position opposite the shallowest portion of the notch 74 in the cam 51. Thereafter the first time one of the recesses 71 or 72 of the cam 43 comes around opposite the projection 67, there is a light sounding of the alarm by the clapper 61. This is repeated each time one of the recesses 71 or 72 is engaged by the projection 67, as long as the projection 66 is in the notch 74. Then when the cam 51 turns until the projection 66 is opposite the deeper end of the notch 74 in the cam 51, then each time one of the recesses 71 or 72 is opposite the projection 67, there is a louder sounding of the alarm by the clapper 61. When the cam has reached the position shown in Fig. 7, the sounding of the alarm will be stopped until the cam 51 revolves until the notch 74 is again opposite the projection 66, or the device is re-set. The cams travel in the directions of the arrows thereon, in the normal operation of the device.

To re-set the device, the knob 60 is pushed in toward the housing 12, in order to disengage the gear 56 from the pinion 49. Thereupon the cam 51 can be re-set at the starting or other intermediate position, by turning the knob 60, while it is pushed to its inward position. The spur gear 58 and gear 53 will then re-set the cam 51, upon turning of the knob. The cam 51 may be set in any desired position, in order to regulate the distance traveled before the next sounding of the alarm, the passing of the bosses 68 and 69 past the flat spring 70 indicating the number of revolutions and position of the cam 51. Suitable indicia can, of course, be placed on the knob and the adjacent portion of the housing member 12 to aid in indicating of the position of the cam 51, such as by the use of figures translated into mileage.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. An annunciator comprising a housing, a pair of parallel shafts, one of which is adapted to be driven, reduction gearing on the shafts to provide a gear train, including a pair of cams, certain gears being loose on at least one of said shafts, an additional shaft having gearing connecting said loose gears and adapted to rotate one of said cams at a slower speed than the other cam, one of said cams having inwardly directed diametrically opposed radial notches and the other of said cams having an elongated notch providing a cam surface increasing in depth from one end to the other, a gong and a striker arm pivotally supported in said housing and provided with a pair of spaced projections normally adapted to ride upon the cylindrical surfaces of the cams, and cause the arm to strike the gong with increasing force each time one of the projections enters the radial notches of the one cam when the other projection rides along the cam surface of the other cam.

2. An annunciator comprising a housing, a pair of parallel shafts, one of which is adapted to be driven, reduction gearing on the shafts to provide a train of gears, including a cylindrical disk having diametrically opposed notches and a disk having a cam surface, certain gears being loose on at least one of said shafts, an additional shaft having gearing connecting said loose gearing and adapted to rotate said second disk at a speed slower than said cylindrical disk, a gong, a striker arm pivotally supported in said housing and provided with spaced projections, and a spring to hold said projections normally in contact with said disks and force one of same into the notches of said first disk when the other projection is on the cam surface of the other disk, said cam surface thereby progressively controlling movement of the striker arm to increase the intensity of the gong as the one projection traverses the cam surface of said disk.

3. An annunciator comprising a housing, a pair of parallel shafts, one of which is adapted to be driven, reduction gearing on the shafts to provide a train of gears, including a pair of disks, one of which is notched and the other of which is provided with a peripheral cam surface, certain of said gears being loose on at least one of said shafts, an additional shaft having gearing connecting said loose gearing and to rotate said cam disk at a speed slower than said notched disk, a gong, a striker arm pivoted in said housing and having the end thereof in riding engagement with said cam disk and with said notched disk to hold the same inactive, said striker arm being actuatable in increasing force as the end thereof enters the notches in the disk when said end has entered and rides upon the cam surface of the other disk, and means for moving the additional shaft relative to said housing to break the gear train and re-set the cam disk.

4. An annunciator comprising a pair of parallel shafts, one of which is adapted to be driven, reduction gearing on the shafts to provide a train of gears including a cam member and a notched disk, certain of said gears being loose on at least one of said shafts, an additional shaft having gearing connecting said loose gearing and arranged to rotate said cam at a speed slower than said disk, spring means to maintain the gearing in connected position, a gong, a striker arm, means holding the end of said striker arm in engagement with said cam member and with said disk to hold same inactive as said end rides over the cylindrical surface of said cam, a portion of said cam controlling the movement of the striker arm to vary the force of its stroke, said portion permitting the end to enter the notches of the disk and the striker arm to operate.

5. An annunciator comprising a pair of parallel shafts, one of which is adapted to be driven, reduction gearing on the shafts to provide a train of gears including a recessed disk, certain of said gears being loose on at least one of said shafts and including a recessed cam, an additional shaft having gearing connecting said loose gearing and arranged to rotate said recessed cam at a speed slower than said recessed disk, a bell, and a striker arm for the bell having an end disposed to ride on said disk and the cylindrical surface of said cam, a portion of said cam controlling the movement of the striker arm to vary the force of its stroke as the recesses in said disk and cam come into registry with each other, said additional shaft being operable to break the gear train and re-set the cam.

6. An annunciator comprising a housing, a bell therein, a striker arm pivoted in said housing, a pair of shafts, one of which is adapted to be driven, reduction gearing on said shafts, a plurality of differently recessed cams on one of said shafts and operable by said gearing at different speeds, said striker arm having an end in engagement with each of said cams and controllable by the registry of said recesses with each other to cause the striker arm to strike the bell with progressively increasing intensity.

MILTON J. STEVENS.

REFERENCES CITED

The following references are of record in the file of this patent:

UNITED STATES PATENTS

| Number | Name | Date |
| --- | --- | --- |
| 290,767 | Gillespie | Dec. 25, 1883 |
| 556,332 | Chadburn | Mar. 17, 1896 |
| 780,753 | Holowell | Jan. 24, 1905 |
| 793,322 | Roberts | June 27, 1905 |
| 946,692 | Buoker | Jan. 18, 1910 |
| 1,047,566 | Rhodes | Dec. 17, 1912 |
| 1,195,494 | Nichols | Aug. 22, 1916 |
| 1,555,926 | Mensing | Oct. 6, 1925 |
| 1,865,592 | Shafer et al. | July 5, 1932 |
| 2,086,785 | Thomas | July 13, 1937 |